(12) United States Patent
Tiemann et al.

(10) Patent No.: US 8,250,823 B2
(45) Date of Patent: Aug. 28, 2012

(54) DOWELS AND METHODS FOR THE ASSEMBLY OF INSULATING PANELS

(75) Inventors: Joachim Tiemann, Sundem (DE); Erhard Hackler, Bad Berleburg-Berghausen (DE); Ulrich Knebel, Bad Berleburg-Berghausen (DE)

(73) Assignee: EJOT GmbH & Co. KG (DE)

( * ) Notice: Subject to any disclaimer, the term of this patent is extended or adjusted under 35 U.S.C. 154(b) by 1349 days.

(21) Appl. No.: 10/647,916

(22) Filed: Aug. 26, 2003

(65) Prior Publication Data
US 2005/0055927 A1 Mar. 17, 2005

(51) Int. Cl.
*E04B 5/00* (2006.01)
(52) U.S. Cl. .......................................... 52/410; 52/463
(58) Field of Classification Search .................. 52/410, 52/463, 585.1; 411/383, 387.6, 399, 387.2, 411/387.5
See application file for complete search history.

(56) References Cited

U.S. PATENT DOCUMENTS

| | | | | | |
|---|---|---|---|---|---|
| 2,779,361 | A | * | 1/1957 | McKiff | 408/204 |
| 3,559,513 | A | * | 2/1971 | Hougen | 408/204 |
| 4,545,270 | A | * | 10/1985 | Dewey | 81/429 |
| 4,579,486 | A | * | 4/1986 | Damico | 408/204 |
| 4,655,656 | A | * | 4/1987 | Jonsson | 411/337 |
| 4,809,477 | A | * | 3/1989 | Gasser | 52/410 |
| 5,054,983 | A | * | 10/1991 | Froewis et al. | 411/480 |
| 5,871,310 | A | * | 2/1999 | Mortensen | 408/1 R |

(Continued)

FOREIGN PATENT DOCUMENTS
EP 0 086 452 A2 8/1983
(Continued)

OTHER PUBLICATIONS

International Society for Neurochemistry, J. Neurochem. Journal of Neurochemistry, 2005, 95, 834-847, Barghorn et al., Globular Amyloid β-peptide$_{1-42}$ Oligomer—A Homogenous and Stable Neuropathological Protein in Alzheimer's Disease.

(Continued)

*Primary Examiner* — Basil Katcheves
(74) *Attorney, Agent, or Firm* — Wood, Phillips, Katz, Clark & Mortimer

(57) ABSTRACT

The invention relates to a dowel having cutting devices at the lower side of the pressing plate at the circumference of said pressing plate for cutting into the insulating panel when the pressing plate is pulled into the insulating panel. The invention further relates to a method, in which a bore-hole is drilled through the insulating panel into the substructure, the dowel and the expansion element are inserted into the bore-hole, the expansion element is driven into the pressing plate and the dowel sleeve, and wherein simultaneously the pressing plate is pulled into the insulating panel under compression of the insulating panel, and the insulating panel is cut in at the circumference of the pressing plate by means of cutting devices. The invention further relates to a method in which a bore-hole is drilled through the insulating panel into the substructure, a circle with at least the radius R is cut into the insulating panel by means of cutting devices, the dowel and the expansion element are inserted into the bore-hole, the expansion element is driven into the pressing plate and the dowel sleeve, and simultaneously the pressing plate is pulled into the insulating panel under compression of the insulating panel.

11 Claims, 9 Drawing Sheets

U.S. PATENT DOCUMENTS

| | | | | |
|---|---|---|---|---|
| 6,065,909 | A * | 5/2000 | Cook | 408/206 |
| 6,308,483 | B1 * | 10/2001 | Romine | 52/410 |
| 6,422,796 | B1 * | 7/2002 | Tomaini | 411/544 |
| 6,676,343 | B2 * | 1/2004 | Burk | 408/204 |
| 7,101,124 | B2 * | 9/2006 | Keightley | 408/204 |

FOREIGN PATENT DOCUMENTS

| | | |
|---|---|---|
| EP | 0 517 667 A1 | 12/1992 |
| EP | 0 849 538 A2 | 6/1998 |
| EP | 1 088 945 A2 | 4/2001 |
| WO | WO 98/33815 | 8/1998 |
| WO | WO 01/10900 | 2/2001 |
| WO | WO 2004/067561 | 8/2004 |

OTHER PUBLICATIONS

The American Society for Biochemistry and Molecular Biology, Inc. The Journal of Biological Chemistry vol. 278, No. 13, Issue of Mar. 28, pp. 11612-11622, 2003, 2003, Stine et al., In Vitro Characterization of Conditions for Amyloid-β Peptide Oligomerization and Fibrillogenesis.

Federation of European Neuroscience Societies. European Journal of Neuroscience, vol. 13, pp. 2015-2024, 2001, Demeester et al., Comparison of the Aggregation Properties, Secondary Structure and Apoptotic Effects of Wild-Type, Flemish and Dutch N-terminally Truncated Amyloid β Peptides.

The American Society for Biochemistry and Molecular Biology, Inc. The Journal of Biological Chemistry, vol. 277, No. 35, Issue of Aug. 30, pp. 32046-32053, 2002, Dahlgren et al., Oligomeric and Fibrillar Species of Amuloid-β Peptides Differently Affect Neuronal Viability.

Proceedings of the National Academy of Sciences of USA, vol. 100, Jan. 7, 2003, pp. 330-335, No. 1, Bitan et al., Amyloid β-protein (Aβ) Assembly: Aβ40 and Aβ42 Oligomerize Through Distinct Pathways.

Elsevier Science Ltd., J. Mol. Biol. (2002) 319, pp. 1279-1290, Wurth et al., Mutations that Reduce Aggregation of the Alzheimer's Aβ42 Peptide: an Unbiased Search for the Sequence Determinants of Aβ Amyloidogenesis.

* cited by examiner

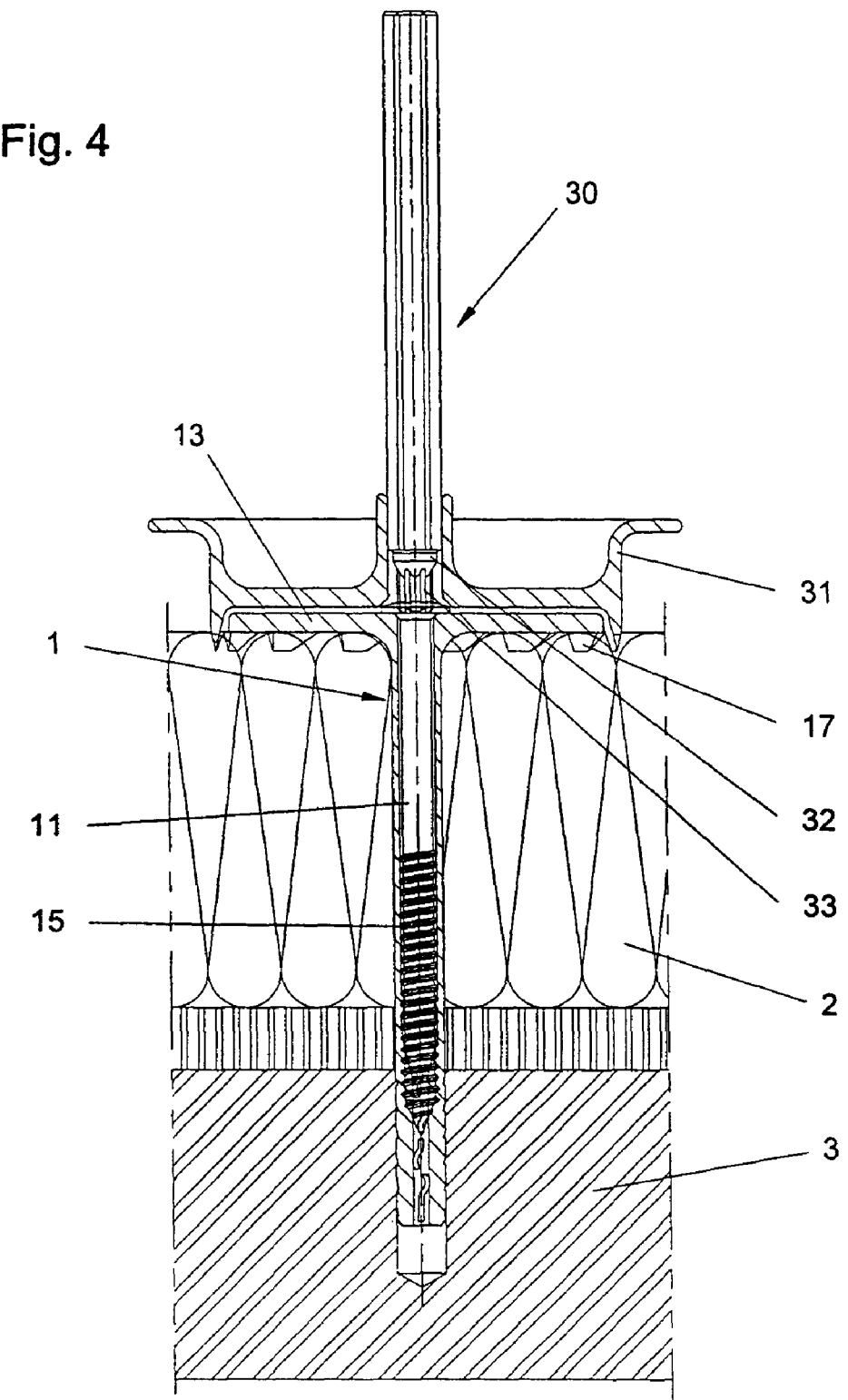

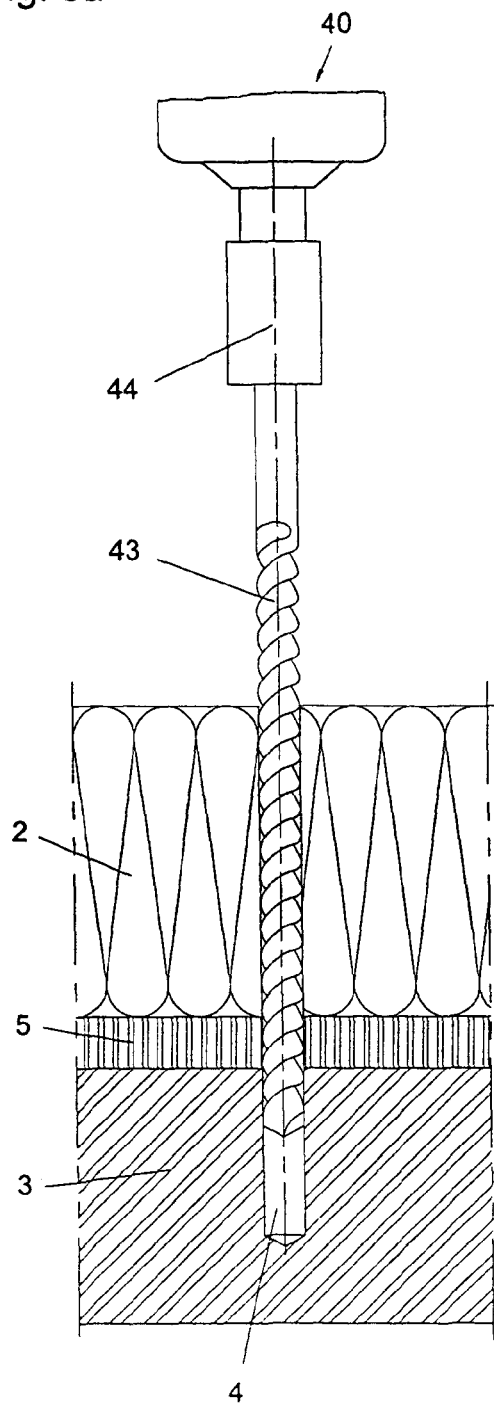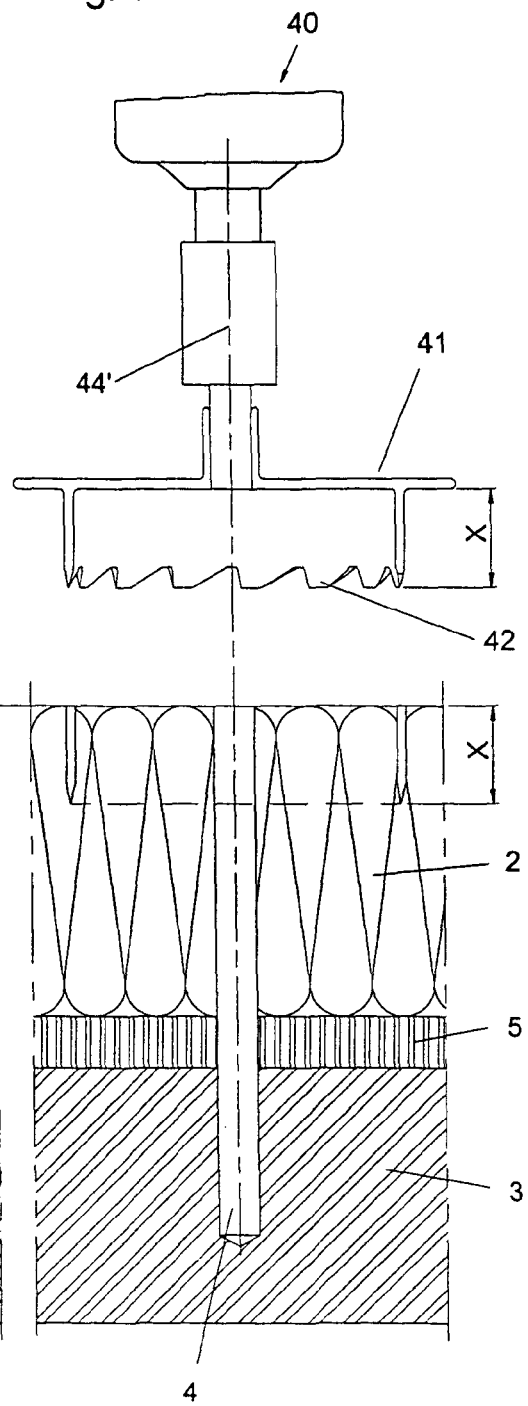

DOWELS AND METHODS FOR THE ASSEMBLY OF INSULATING PANELS

FIELD OF THE INVENTION

The present invention relates to a dowel, a process and further to devices for mounting insulating plates on a substructure, wherein the dowel includes a pressing plate and a dowel sleeve attached to said pressing plate for taking up an expansion element having an expansion element head, wherein the dowel sleeve comprises an expansion zone, and wherein a recess is formed in the insulating plate by the dowel itself during mounting.

BACKGROUND OF THE INVENTION

Conventional dowels for mounting insulating plates have the disadvantage, that they cannot entirely prevent the formation of thermal bridges, which also applies for dowels having a plastic coat or heads made of plastic. Substantially, this results from the diversity of the materials of which the insulating material on the one hand and the dowel on the other hand are made. This diversity may also lead to undesirable dowel show-through in the plaster layer at the outer walls, especially when exposed to moisture and wetness. This disadvantage occurs frequently when applying basic plaster qualities. To achieve a better thermal insulation and to avoid dowel show-through in the plaster layer, a sunk-in mounting of the dowel in the insulating plate has been suggested.

A process where a recess is formed in the insulating plate for taking up the dowel, simultaneously with the drilling of the bore-hole for the dowel is known from EP 0 086 452. In this case, a recess corresponding to the diameter of the pressing plate is milled into the insulating plate when drilling the bore-hole in the same process step, by means of a countersink drill which includes a milling head and a plate-like stopper, and subsequently closed with a covering which is already arranged on said pressing plate. Due to the fact that the covering is arranged on the pressing plate respectively on the dowel head as provided by the factory, an additional process step is avoided during mounting. However, the milling leads to a considerable abrasion of insulating material. Considering the large number of dowels which are regularly used for mounting insulating plates when building a house, the generated milling dust poses a considerable pollution of the environment, and, in larger amounts, may also lead to health problems for the construction personnel. Further, the mounting properties of dowels having coverings applied at the factory are clearly inferior to comparable dowels without applied covering. Due to the insufficient resistance to pressure of the insulating material and the thus limited drive-in-forces, only low dowel expansion forces are possible, which can lead to considerably poorer values regarding the draw-out resistance. Further, in production such dowels are significantly more expensive than conventional embodiments. Additionally, for carrying out the known process a specific countersink drill is required, being likewise expensive in production.

A further known solution comprises a milling crown, e.g. made of plastic, by means of which a recess can be milled into the insulating material after the bore-hole has been drilled. Then the dowel is introduced into the bore-hole and subsequently mounted. Thereafter, the covering is applied. This solution contains two more process steps as compared to EP 0 086 452 and therefore is more time-consuming. Apart from that, there is also a considerable environmental burden because of the generated milling dust.

EP 1 088 945 discloses an insulating element, which consists of mineral fibers and comprises markings for the arrangement of dowels for insulating material. The markings can be located in recesses within the insulating element respectively be formed as recesses. Preferably, the recesses are formed mechanically or in the case of thermoplastic insulating materials by local heating. The production of such insulating elements is connected with considerable costs on the one hand, on the other hand the pre-fabricated recesses leave no room for the construction personnel on-side for an assembly of the dowel for insulating material which deviates from the predetermined pattern. It is also not taken into consideration that the respectively most advantageous geometric arrangement of the dowels for insulating material with regard to the insulating plate may vary enormously depending on the special circumstances and the weather conditions.

Further, pre-forms of mineral wool for acoustic and thermal insulation of household appliances are known from utility model DE 296 22 196. These form-parts comprise areas of material, in which recesses are formed. These areas of material are thereby exposed across the depths of the predetermined recess by cut-ins with regard to the surrounding material, and are already pre-compressed during the production by means of a pressure piston. Thereby, the material is compressed in such a way that it comprises a residual elasticity for enabling a limited adaptation to changes in the configuration during the assembly of ovens etc. Also in this case, expensive pre-formed parts are considered. For the construction industry, especially with regard to the mounting with dowels for insulating material, parts produced in such a way are not suitable since they do not comprise the required stiffness.

BRIEF SUMMARY OF THE INVENTION

It is the object of the invention to provide a dowel, a process and further devices, by means of which the pollution of the environment by milling the insulating material can be avoided, a recessed mounting of the dowel in the insulating material with as few process steps as possible can be insured, a properly formed face surface can be generated, cheaper dowels can be applied and finally a tight anchorage of the dowel in the substructure can be achieved. This shall be achieved for beat-in dowels as well as for screw dowels.

According to the invention the object is achieved on the one hand by a dowel having cutting devices at the lower side of the pressing plate at the circumference of said pressing plate for cutting in the insulating plate when the pressing plate pulls into the insulating plate, and a process in which a) a bore-hole is drilled through the insulating plate into the substructure, b) the dowel and the expansion element are inserted into the bore-hole, c) the expansion element is driven into the pressing plate and the dowel sleeve, and wherein simultaneously d) the pressing plate is pulled into the insulating plate under compression of the insulating plate, and the insulating plate is cut in at the circumference of the pressing plate by means of cutting devices. Therein all steps a) to d) can run simultaneously; the steps a) and b) however may also occur before the steps c) and d), namely combined or separately. On the other hand, the object according to the invention is also achieved by a process comprising at minimum the steps a) drilling a bore-hole through the insulating plate into the substructure, b) cutting in a circle having at least the radius R into the insulating plate by means of cutting devices, c) inserting the dowel and the expansion element into the bore-hole, d) driving in the expansion element into the pressing plate and the dowel sleeve and simultaneously e) pulling in the pressing plate into the insulating plate under compression of the insulating plate. These steps may be performed in the mentioned order, but not necessarily.

In a preferred embodiment of the invention, the pressing plate includes a pressing plate shaft which can be shifted axially along the dowel sleeve. By shifting the pressing plate shaft along the dowel sleeve, the length of the dowel can be reduced when driving it into the bore-hole. The shifting can be achieved in many ways, for instance by means of sliding grooves in both parts. Instead of shifting the parts against each other, also formable parts may be used, for instance a dowel sleeve having a form of crumple zone.

Advantageously the pressing plate comprises a recess for taking up a drive, for example a hexagon drive, in order that the rotation can be transferred onto the pressing plate. Alternatively, an inward torx for example can be provided in the pressing plate, in which the expansion element engages.

Preferably the dowel comprises an anti-twist device for transferring the initial torque when driving in the expansion element. This can be achieved for instance in the pre-assembly position by means of the pressing plate already sticking into the insulting material or within the bore-hole by means of outer fins on the dowel sleeve.

In a preferred alternative of the method according to the invention comprising the steps a) to d), a covering is placed on the entirely sunk in pressing plate in a further step e) after the complete pulling-in of the pressing plate into the insulating plate which may possibly lead to quicker operations—provided that there is an appropriate division of labor—, as if the covering is for instance individually placed on the hexagon drive of a bit before.

In a further preferred embodiment of the invention, a device is used for the sunk-in mounting of a conventional dowel for driving in the expansion element into the dowel sleeve, which comprises a depth stop having cutting devices for cutting in the insulating plate along the circumference of the pressing plate.

As already mentioned above, the idea underlying the invention also includes a method wherein the illustrated problem is solved in such a way that previous to the insertion of the dowel and the expansion element into the bore-hole, a circle is cut into the insulating plate, namely by means of cutting devices, which are arranged on a device for drilling the bore-hole. Subsequently, when driving in the expansion element, the circular cut-out in the insulating plate is compressed.

In an appropriate alternative of the inventive method, step b) is carried out before step a), i.e. initially the circle is cut into the insulating plate and then the bore-hole is drilled. If the bore-hole would be arranged eccentrically with regard to the cut-in circle, the dowel would compress the circular surface area which overlaps with the cutting circle while pulling in and thus holes would be generated in the insulating plate after putting on the coverings.

In a preferred alternative of the inventive method, steps a) and b) are running simultaneously, so that time can be saved when mounting the dowel.

In a further preferred alternative of the inventive method, a covering is put on the entirely sunk-in pressing plate after pulling in the pressing plate, whereby axially one process step more is generated compared to dowels having coverings applied already at the factory; but all in all a much more stable anchorage of the dowel in the substructure is achieved.

In a further preferred embodiment of the inventive method, the cutting devices include a depth stop, in order that the insulating plate can be cut in uniformly, a uniform mounting depth of the dowels can be ensured and finally the coverings can be inserted well-fitting.

The invention also comprises a device for drilling a bore-hole through an insulating plate into a substructure, having a shaft for inserting a drilling adapter, wherein the shaft is formed in such a way that cutting devices for cutting in a circle into the insulating plate can be arranged on said shaft. By means of this device, the circles may be cut into the insulating plate either before or after the drilling of the bore-hole. This may occur in a rotating but also in a non-rotating manner.

In a preferred embodiment of the device according to the invention, the cutting devices comprise a depth stop, in order to guarantee a uniform cut-in-depth.

The invention further includes a device for drilling a bore-hole through an insulating plate into a substructure, having a drill shaft wherein cutting devices for cutting in a circle into the insulating plate are arranged at said drill shaft. Thus, for example it is not necessary that after drilling the bore-hole, respectively the bore-holes, a new adapter has to be clamped into the fitting of the device, to generate a circular cut-in into the insulating plate. Besides, in this way the concentric arrangement of the cut-in circle with respect to the bore-hole is guaranteed. To ensure a uniform cut-in depth, the cutting devices may include a depth stop.

The invention further contains cutting devices for cutting in a circle into an insulating plate which are formed in such a way that they may be arranged on a devices for drilling a bore-hole through an insulating plate into a substructure. Thereby, cutting devices may include a depth stop.

By means of the drawings, the mounting of a dowel according to the invention and of a conventional dowel according to the method according to the invention are illustrated. It shows:

DETAILED DESCRIPTION OF THE INVENTION

Figure 1:
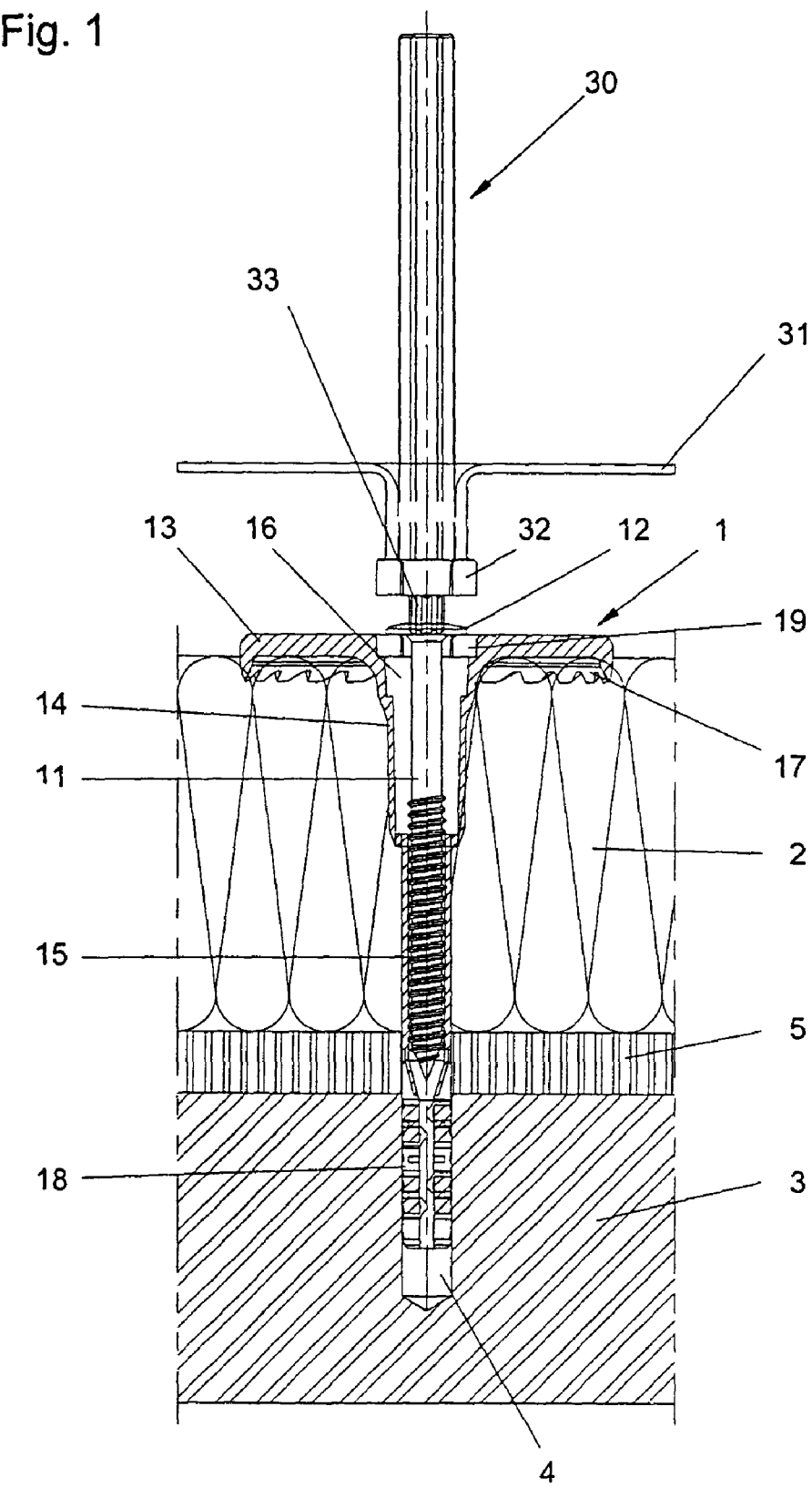
FIG. 1 a longitudinal section through a dowel according to the invention at the beginning of the mounting, FIG. 2 a longitudinal section through a dowel according to the invention in final assembly position, FIG. 3 a longitudinal section through a dowel according to the invention in finally assembled state with applied covering, FIG. 4 a longitudinal section through a conventional dowel and a drive-in device, the depth stop of which is provided with cutting devices, FIG. 5a a longitudinal section through a conventional device for drilling a bore-hole, FIG. 5b a longitudinal section through a device according to the invention for cutting in a circle into the insulating material, FIG. 6 a longitudinal section through a device according to the invention for drilling a bore-hole and simultaneously cutting in a circle into the insulting material, FIG. 7 a longitudinal section through a dowel with expansion element before assembly, FIG. 8 a longitudinal section through a dowel in finally assembled position, FIG. 9 a longitudinal section through a dowel in finally assembled position with applied covering.

FIG. 1 shows the dowel 1 which has already been put through an insulating plate 2 and an intermediate layer 5 into the brickwork 3. The pressing plate shaft 14 and the dowel sleeve 15 are connected with each other in this state, for inserting the dowel in full length. The pressing plate 13 which is provided at its lower side with radial cutting devices 17, lies on the surface of the insulating plate 2, wherein the cutting devices 17 are stuck in the insulating material thus serving as an anti-twist device. The pressing plate 13 is usually provided with co-axially arranged openings, however, regarding compressing the insulating material as uniformly as possible, also embodiments without openings are conceivable. The expansion element 11, preferably an inside torx screw in this case, has been inserted into the dowel sleeve 15 up to the expansion zone 18 by means of a respective drive 32, 33, so that the expansion element head 12 does not yet bear on the recess 16. The expansion element 11 can be realized without plastic extrusion coat or plastic head, since there is no contact with the plaster layer and thus no danger of corrosion. When the head 12 of the screw 11 finally bears on recess 16, the process of compressing the insulating material starts. For achieving that the pressing plate 13 also rotates during the assembly, the drive 32, 33 engages in a recess 19 in the pressing plate 13 which is provided for this reason. Another possibility is that the screw 11 engages into pressing plate 13 by means of an engagement device, as for example an inside torx. The rotating pressing plate 13 cuts itself into the insulating material by means of its cutting devices 17 being arranged at its outer edge and simultaneously it begins to compress the circular cut out in the insulating material which is located beneath the pressing plate 13. The outer cutting devices effect that a clean, i.e. smooth, in this case radial face surface is generated, which is the precondition for a well-fitting insertion and a tight support of the covering within the insulating plate. Thus, the insulating material beneath the pressing plate 13 is substantially compressed, instead of being milled off. There might also be a slight abrasion of insulating material, for instance by means of the cutting edges on a rotating pressing plate 13. In any case, the pollution of the environment can be decreased significantly by reducing the milling waste. The connection between dowel-sleeve 15 and pressing plate 13 is loosened by the tensile force of the screw, whereby the pressing plate 13 can be axially displaced across the dowel sleeve 15 for the compression. The dowel length is then so to speak lessened by the assembly depth. Preferably, the assembly depth is 20 mm. The area between dowel sleeve 15 and pressing plate 13 which in this case is formed as pressing plate shaft 14 and in which the axial length compensation takes place, is provided with special sealing areas, as for example sealing lips, in order to ensure the tightness of dowel sleeve 15. During the compression of the insulating material, the screw further screws in axially in the expansion zone 18 of dowel sleeve 15 with increasing pull-in depth, and generates for example by means of frictional engagement the desired solid anchorage in brickwork 3. The term "expansion zone" in this case describes any form of anchorage or clamping mechanism of dowel 1 in the substructure 3 due to the insertion of expansion element 11. The screw length is coordinated with the final assembly state. If the thread for example sticks in the expansion zones by 10 mm before compression, and if the dowel is then mounted in this example 20 mm deep in the insulating material, a thread reach into the brickwork of 30 mm results. These values may vary significantly, depending on the type of insulating material used. To ensure uniform assembly depth, the drive in device 30 is provided with a depth stop 31.

The compression of the insulating material causes that deliberately compressive strains are brought into the insulating material by squeezing the insulating material, to compress the latter. Thereby the system of insulating material and pressing plate 13 becomes more stiff in the loaded state. The reason for this is that in loaded state, when pulling the insulating material over the pressing plate, respectively pulling the pressing plate through the insulating material, the latter can no longer be compressed easily, since it is already compressed respectively packed. Thereby the load-deformability behavior is formed more stiffly, since at equal load significantly shorter deformation ways exist, as compared to non-compressed respectively milled insulating materials which are not packed.

Figure 2:
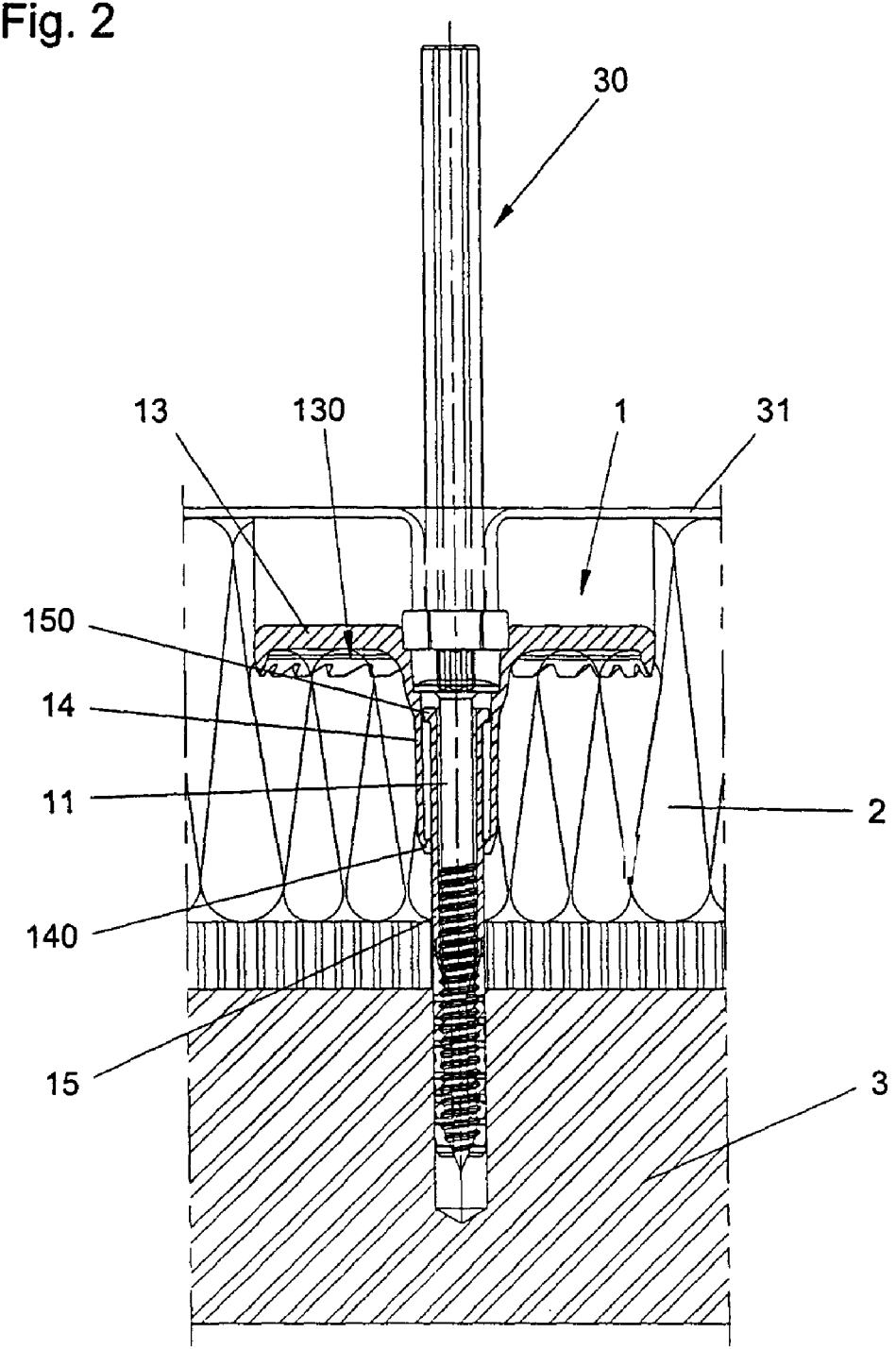

FIG. 2 shows the dowel 1 in final assembly position wherein depth stop 31 of drive in device 30 bears on the surface of the insulating plate and wherein the distance between the depth stop 31 and the lower edge 130 of pressing plate 13 is preferably 20 mm. The dowel length is now reduced by the assembly depth, i.e. the pressing plate 13 with pressing plate shaft 14 has been displaced on the dowel sleeve when compressing the insulating material. The initial connection between the dowel sleeve 15 and the pressing plate shaft 14 is released. The circumferential projection 150 being located at the end of the dowel sleeve 15 which faces the outside, and the corresponding circumferential projection 140 being located at the end of the pressing plate shaft 14 which faces the brickwork, guarantee for a sliding axial guidance of the pressing plate shaft 14 on the dowel sleeve 15. The projections 140, 150 are connected non-positively, positively or adhesively bonding, for example bonded or connected via a break-off seam; at the beginning of the compression procedure, this connection is released due to the tensile force of the expansion element 11 while screwing-in. In final assembly state, the circumferential projection 150 is located closely beneath the screw head 12, which bears on recess 16.

Figure 3:
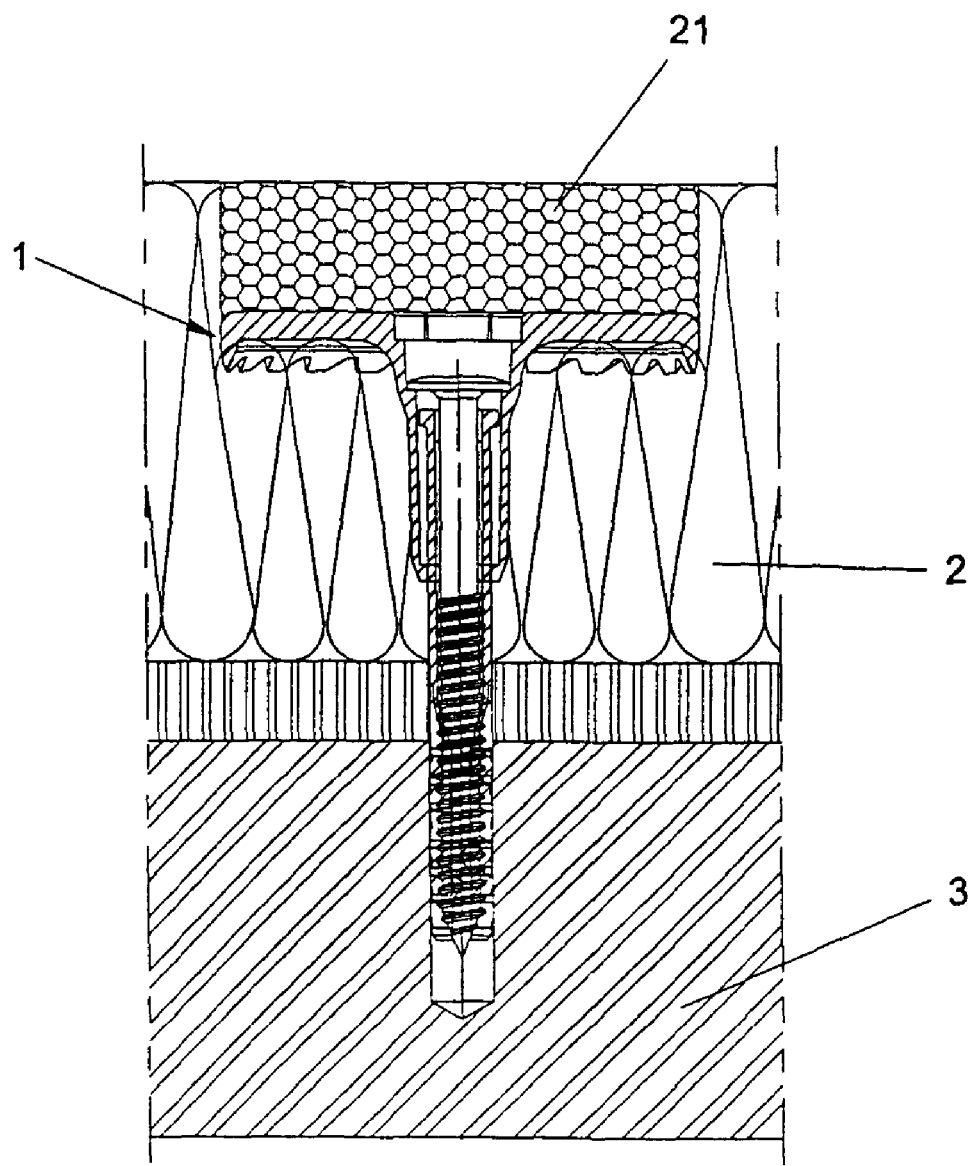

FIG. 3 shows dowel 1 in assembled state with put on covering 21, wherein the covering 21, shown in the example, exactly terminates with the surface of the insulating plate 2. A subsequent abrasion of a partly projecting covering 21 is indeed also possible. In this case, however, one has to accept some milling respectively abrasion waste. The covering can be inserted separately subsequent to the assembly of the dowel, or it be may be set simultaneously with the assembly, in such a way that it is put on a hexagon drive 32 of a bit 33. To create an especially tight fit of the covering it is conceivable, to direct the cutting devices 17 slightly outward, to form the resulting recess slightly conical. This deformation of the cutting devices may for example take place by a bulging of the pressing plate during the assembly. Equally, the covering can be formed conical in case of a cylindrical recess. Preferably, the covering is made of the same material as the used insulating plates. Possible materials are for example styrofoam, polyurethane foam, insulating cork, wood wool, wood fiber, coco fiber or mineral wool.

FIG. 4 finally shows a conventional dowel 1, the expansion element 11 of which is driven into the dowel sleeve 15 by means of a device 30 respectively its drive 32, 33. The dowel 1 comprises no cutting devices, instead cutting devices are arranged on the depth stop 31 along the circumference of the pressing plate 13, which cut into the insulating plate 2, while the pressing plate 13 pulls in and compresses the insulating material. In this way, also conventional dowels may be assembled sunk-in.

FIG. 5a shows the device 40 for drilling a bore-hole 4 with the drill bit 43 being clamped at the drill shaft 44 when drilling a bore-hole 4 through the insulating plate 2, the intermediate layer 5 and the brickwork 3.

FIG. 5b shows the device 40 for cutting in the insulating material, with the cutting devices 42 being clamped at the shaft 44' which also comprise a depth stop 41. The cutting devices 42 with depth stop 41 may for instance be provided with an inside torx or a hexagon-like opening and thus may be pinned up on a corresponding shaft 44', respectively a corresponding mounting bit. It is also conceivable that the cutting devices 42 with the depth stop 41 are fixedly arranged at the shaft 44' or engaged with the latter or cooperate with it in another suitable manner. The rotating cutting devices 42 cut into the insulating plate 2 after the bore-hole 4 has been drilled with a conventional device, and cause that a proper, i.e. smooth, in this case radial face surface is generated, which is the precondition for a well-fitting insertion and a tight fit of the covering 21 in the insulating plate 2. In this connection, however, some insulating material may be removed by the rotating cutting edges. Depending on the insulating material, the device for cutting into the insulating material does not have to be driven-in in a rotating manner, but can also just be pushed into the insulating material as a sort of cut-out-tool. In any case however, the environmental pollution is significantly decreased by the substantial reduction of the milling waste. The depth stop 41 provides for a uniform cut-in depth X into the insulating plate 2.

Figure 6:
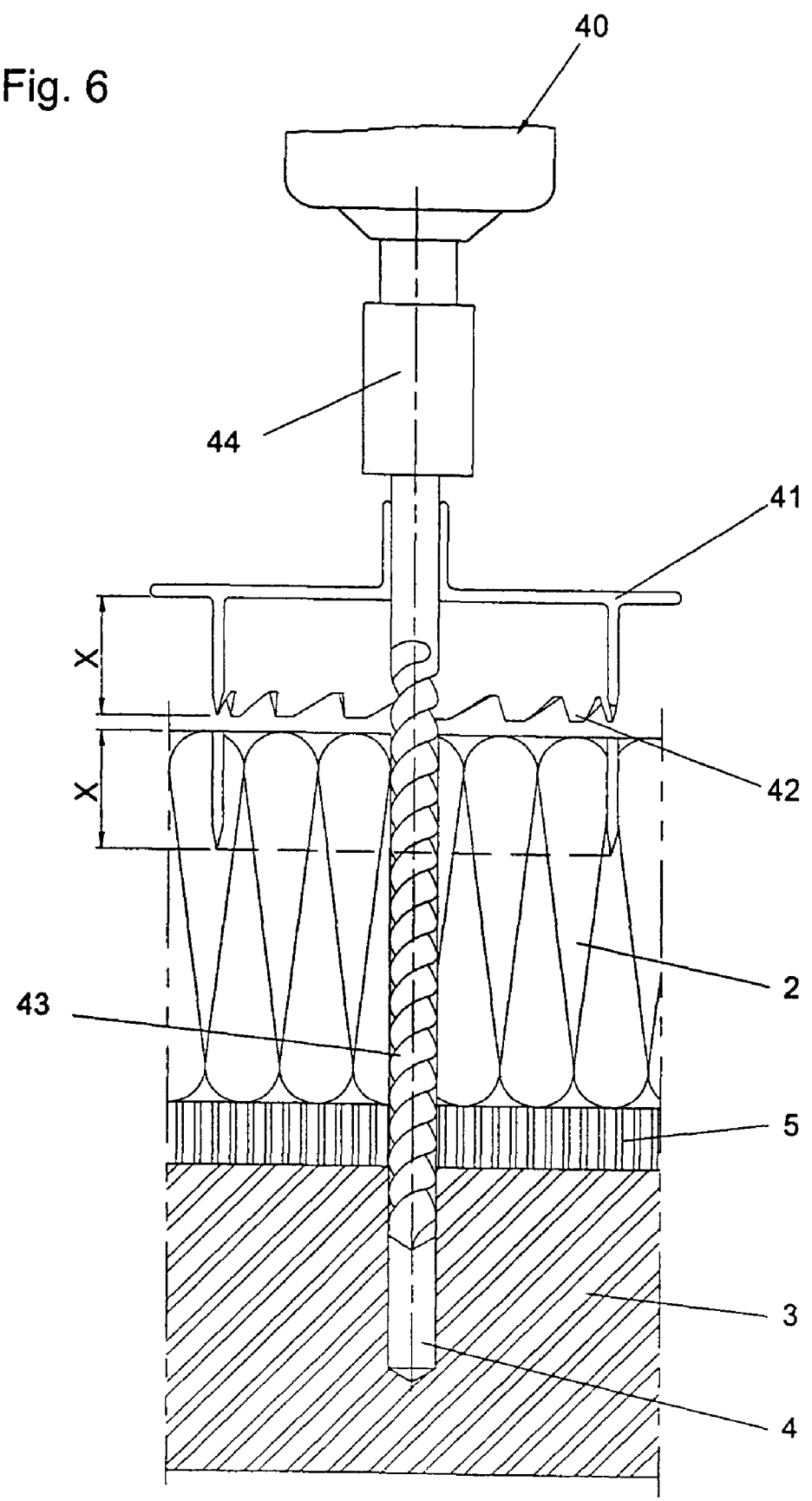

FIG. 6 shows a device 40 for drilling a bore-hole 4 with the drill bit 43 being clamped at the drill shaft 44, wherein the cutting devices 42 with the depth stop 41 are also arranged at the drill shaft 44. It is also possible for this embodiment that the cutting devices 42 with depth stop 41 are arranged fixedly at the drill shaft 44, or that they, depending on the design of the drill shaft 44, can be pinned up on the latter, engage with it or cooperate otherwise with it. The device 40 enables that simultaneously with the drilling of the bore-hole 4, the circular cut-in with the depth X into the insulating plate 2 is carried out. Furthermore, the desired arrangement of the cut-in circle with respect to the bore-hole is guaranteed by means of the device, and thus, holes respectively gaps in the insulating material are avoided.

Figure 7:
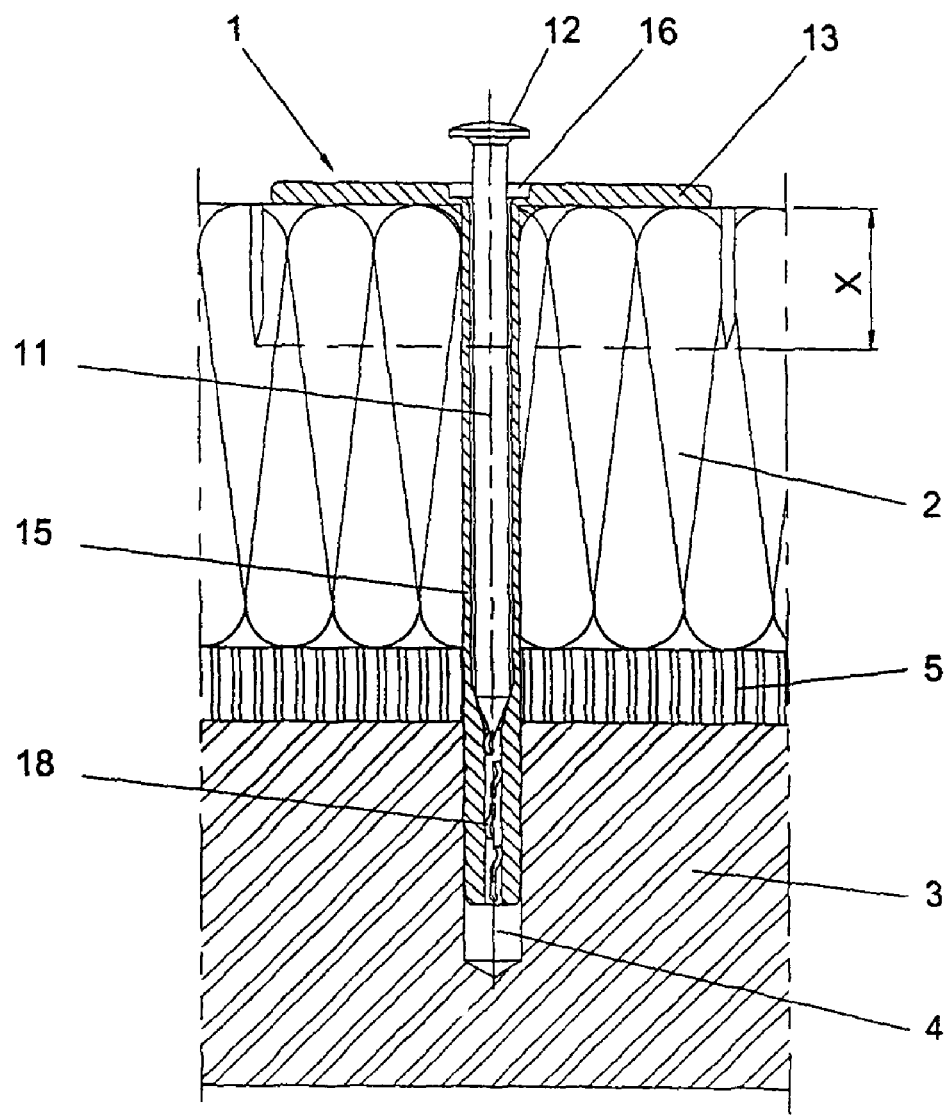

FIG. 7 shows a dowel 1 in the pre-assembly state, which has been inserted through the insulating plate 2 and the intermediate layer 5 into the brickwork 3. The pressing plate 13, having the recess 16 for taking up the expansion element head 12 thereby bears on the surface of the insulating plate 2, and namely in such a way that the insulating material area defined by the cut-in circle is located exactly beneath the pressing plate 13. This surface area being destined for compression is equally large or somewhat larger as the area of the pressing plate 13. The expansion zone 18 of dowel 1 already extends into the brickwork 3. The expansion element 11 with the expansion element head 12 is already inserted in the dowel sleeve 15, but does not yet bear on the recess 16 of the pressing plate 13. The expansion element 11 in this example is formed as a nail, but a screw can also be applied. Further, the expansion element 11 can be formed with or without a plastic coating or plastic head, since there is no contact with the plaster layer and thus also no danger of corrosion.

Figure 8:
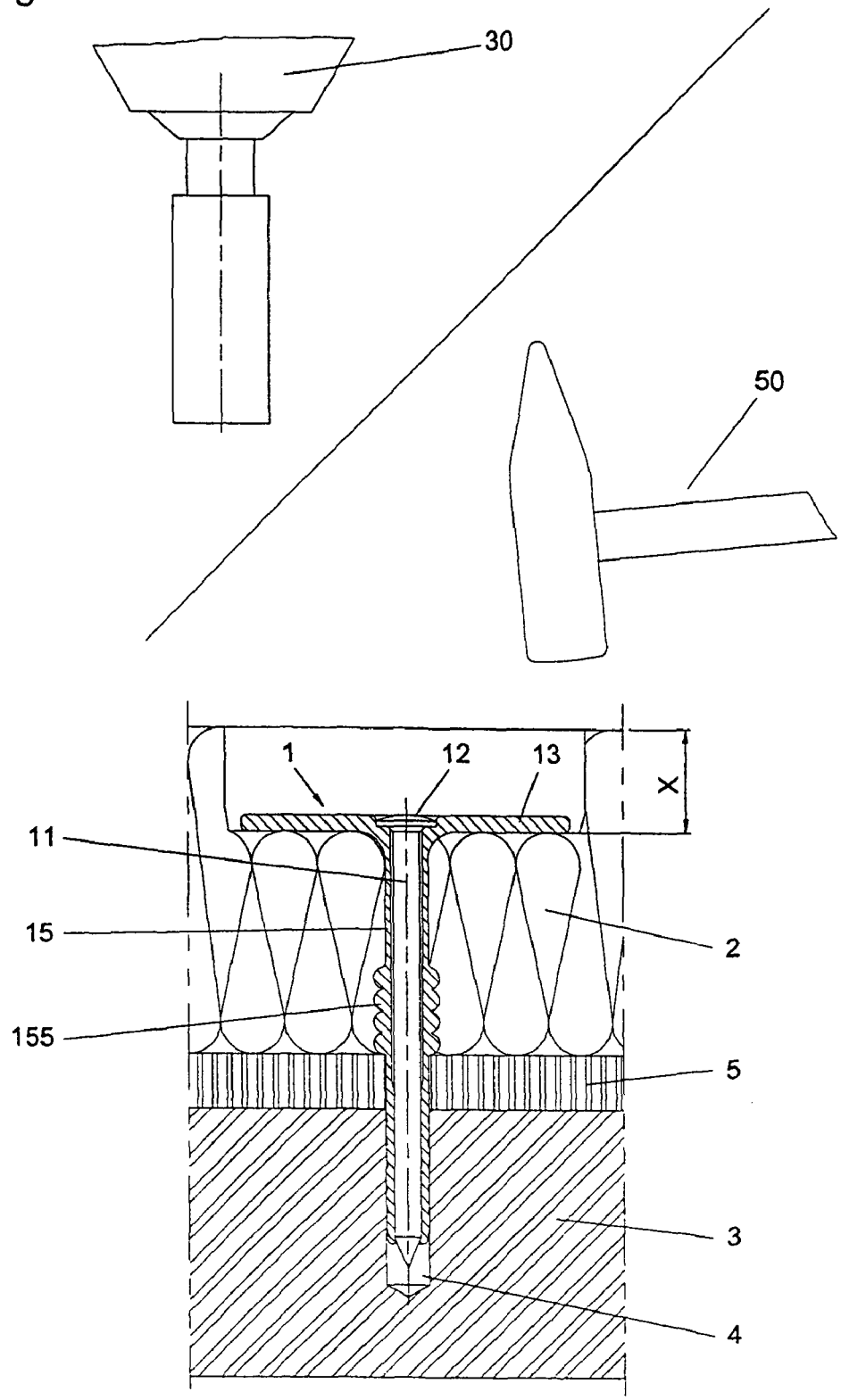

FIG. 8 shows a dowel 1 after the compression of the circular insulating material cut-out being located beneath the pressing plate 13. The process of compressing the insulating material starts when the head 12 of expansion element 11 bears on the recess 16 of pressing plate 13, and the required force for setting dowels 30 is applied by means of a suitable device for completely driving in the expansion elements. In case of nail-like expansion elements 11, this may also be done manually by means of a hammer 50. Thus, the insulating material beneath the pressing plate is substantially compressed, instead of being milled off. During the compression of the insulating material, the expansion element 11 is brought further axially into the expansion zone 18 of dowel sleeve 15 and generates the desired tight anchorage in the brickwork 3, for example by force transmission by friction, positive fit or adhesive bonding. The term "expansion zone" herein describes any form of anchorage or clamping mechanism of dowel 1 in the substructure 3 due to the insertion of expansion element 11. By using a dowel 1 with a crumple zone 155, which is formed during the compression procedure within the insulating material, it can be avoided that the expansion zone 18 slides forward in the brickwork 3. The reduction of the dowel sleeve 15 created in this way, further enables the use of a shorter, thus less expensive expansion elements 11.

Figure 9:
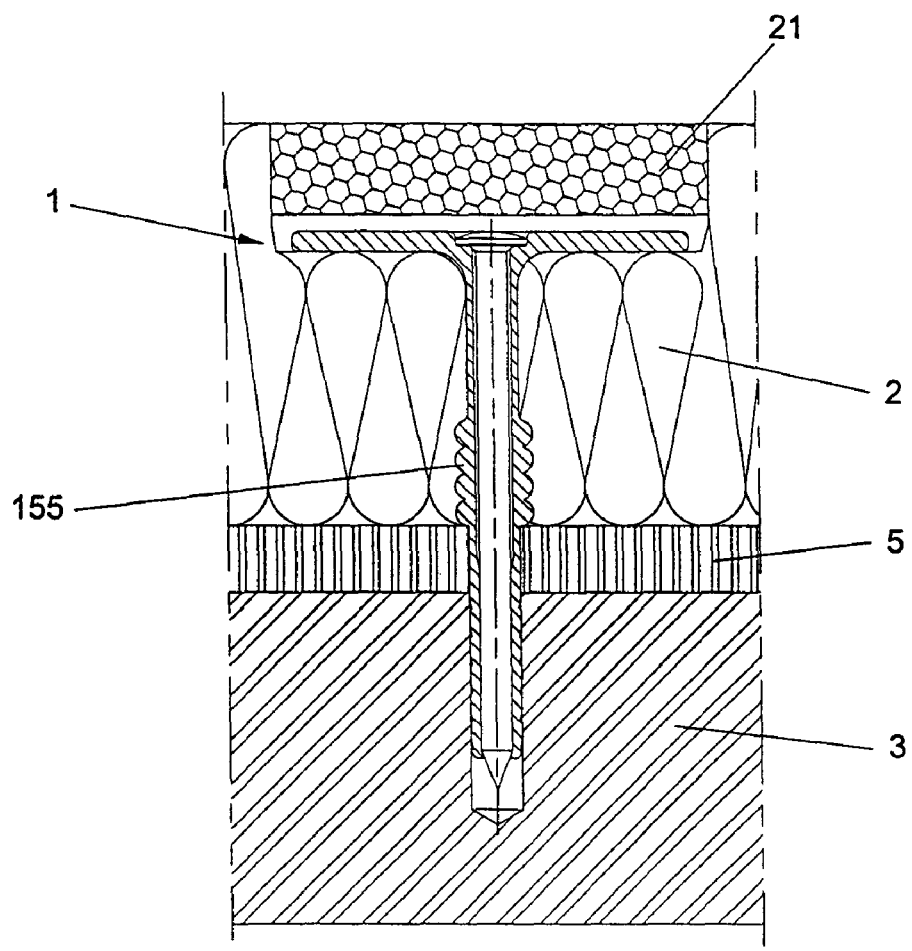

FIG. 9 shows the dowel 1 in final assembly state with crumple zone 155 being formed and covering 21 being put on, wherein the covering 21 in the example exactly terminates with the surface of the insulating plate 2. To avoid a supplementary abrasion of the covering, a space can be provided between the pressing plate and the covering, thereby the covering can always be positioned surface-flush with regard to the insulating plate. The covering may be inserted separately following the assembly of the dowel, or it can be set simultaneously with the assembly, by putting it on the device for setting the dowels 30 beforehand. Equally, the covering may be formed conical in case of a cylindrical recess. Preferably, the covering is made of the same material as the used insulating plates. Possible materials are for example styrofoam, polyurethane foam, insulating cork, wood wool, wood fiber, coco fiber or mineral wool.

The above-described invention is not only suitable for a screw dowel, it may also be applied for a beat-in dowel, wherein the lastly described alternative of the method according to the invention preferably is applied for the assembly of beat-in dowels.

The invention claimed is:

1. A dowel (1) for use in the assembly of an insulating plate (2) on a substructure (3), said dowel (1) having a pressing plate (13) and a dowel sleeve (15) attached to said pressing plate (13) for taking up an expansion element (11) having an expansion element head (12), wherein the dowel sleeve (15) comprises an expansion zone (18), characterized by said pressing plate (13) having a single planar lower side with a single outer circumference; and cutting elements on the lower side of the pressing plate consisting of a tooth-shaped cutting edge (17) extending from the lower side of the pressing plate (13) at the outer circumference of said pressing plate, said cutting elements being curved along a circumferential length to substantially follow said pressing plate outer circumference and adapted to cut a smooth circular face into the insulating plate (2) during pulling in of said pressing plate (13) into the insulating plate (2) under simultaneous compression of said insulating plate (2).

2. Dowel according to claim 1, characterized by a pressing plate (13) having a pressing plate shaft (14) attached therewith, wherein the pressing plate shaft (14) and the dowel sleeve (15) can be axially shifted against each other.

3. Dowel according to claim 1 characterized in that the pressing plate (13) includes an engagement device, in which the expansion element (11) can engage.

4. Dowel according to claim 1, characterized in that the dowel sleeve (15) comprises an anti-twist device against twisting of the dowel sleeve (15) within the bore-hole (4).

5. Dowel according to claim 1, characterized in that the pressing plate (13) comprises a recess (19) for the engagement of a drive (32, 33).

6. Dowel according to claim 2, characterized in that the pressing plate (13) comprises a recess (19) for the engagement of a drive (32, 33).

7. Dowel according to claim 6, characterized in that the pressing plate (13) includes an engagement device, in which the expansion element (11) can engage.

8. Dowel according to claim 5, characterized in that the pressing plate (13) includes an engagement device, in which the expansion element (11) can engage.

9. Dowel (1) for the assembly of an insulating plate (2) on a substructure (3) having a pressing plate (13) and a dowel sleeve (15) attached to said pressing plate (13) for taking up an expansion element (11) having an expansion element head (12), wherein the dowel sleeve (15) comprises an expansion zone (18), characterized by the pressing plate (13) having a single planar lower side circular about an axis with a maximum radius from the axis at its single outer rim of said plate lower side, and cutting elements on the lower side of said pressing plate consisting of cutting devices (17) arranged at the outer rim, said cutting elements being curved with said maximum radius to substantially follow said pressing plate outer rim.

10. Dowel according to claim 9, characterized in that the dowel sleeve (15) comprises an anti-twist device against twisting of the dowel sleeve (15) within the bore-hole (4).

11. A dowel (1) for use in the assembly of an insulating plate (2) on a substructure (3), said dowel (1) having a pressing plate (13) and a dowel sleeve (15) attached to said pressing plate (13) for taking up an expansion element (11) having an expansion element head (12), wherein the dowel sleeve (15)

comprises an expansion zone (18), characterized by said pressing plate (13) having lower side with a single outer circumference; and cutting elements on the lower side of the pressing plate consisting of a tooth-shaped cutting edge (17) extending from at the lower side of the pressing plate (13) at the outer circumference of said pressing plate, said cutting elements being curved along a circumferential length to substantially follow said pressing plate outer circumference and adapted to cut a smooth circular face into the insulating plate (2) during pulling in of said pressing plate (13) into the insulating plate (2) under simultaneous compression of said insulating plate (2).

* * * * *